US008515495B2

(12) United States Patent
Shang et al.

(10) Patent No.: US 8,515,495 B2
(45) Date of Patent: Aug. 20, 2013

(54) MIMO COMMUNICATION SYSTEM

(75) Inventors: Rong Rong Shang, Beijing (CN); Zhu Yan Zhao, Beijing (CN); Seppo Olavi Hamalainen, Espoo (FI); Osman Nuri Can Yilmaz, Helsinki (FI)

(73) Assignee: Nokia Siemens Networks Oy, Espoo (FI)

( * ) Notice: Subject to any disclaimer, the term of this patent is extended or adjusted under 35 U.S.C. 154(b) by 0 days.

(21) Appl. No.: 13/202,881

(22) PCT Filed: Feb. 27, 2009

(86) PCT No.: PCT/IB2009/005039
§ 371 (c)(1),
(2), (4) Date: Sep. 19, 2011

(87) PCT Pub. No.: WO2010/097650
PCT Pub. Date: Sep. 2, 2010

(65) Prior Publication Data
US 2012/0003999 A1 Jan. 5, 2012

(51) Int. Cl.
*H04M 1/00* (2006.01)
(52) U.S. Cl.
USPC ............ 455/562.1; 455/561; 455/73; 455/83; 455/84

(58) Field of Classification Search
USPC ...... 370/342, 347, 331, 328, 338; 455/422.1, 455/424, 522, 553.1, 561
See application file for complete search history.

(56) References Cited

U.S. PATENT DOCUMENTS

| 6,480,524 B1 | 11/2002 | Smith et al. |
| 2002/0061005 A1 | 5/2002 | Lee et al. |
| 2009/0122910 A1* | 5/2009 | Wen et al. ..................... 375/295 |

FOREIGN PATENT DOCUMENTS

| EP | 1 111 812 A1 | 6/2001 |
| EP | 1 976 133 A1 | 10/2008 |

OTHER PUBLICATIONS

Fourestie, et al., "High Power Amplifier or Site Power Sharing: Comparison of Two Low Cost Solutions to Boost UMTS Downlink Capacity", (2005), (pp. 595-597).

* cited by examiner

*Primary Examiner* — Kathy Wang-Hurst
(74) *Attorney, Agent, or Firm* — Harrington & Smith

(57) ABSTRACT

A device and method including a plurality of transmitters and/or receiver units and antennae therefore, and wherein each of said units are arranged radially to cover a plurality of sectors; and including at least one component necessary for the operation of said units, and arranged such that said component is shared between two or more units and/or their respective antennae. The device and method has application to MIMO systems.

20 Claims, 9 Drawing Sheets

| | Sector 1 | Sector 2 | Sector 3 | .... | Sector N |
|---|---|---|---|---|---|
| Antenna Used | Ant 1 | Ant 2 | Ant 3 | .... | Ant N |
| PA Used | PA N & PA 1 | PA 1 & PA 2 | PA 2 & PA 3 | .... | PA N-1 & PA N |
| Control Signals | C1/E1 and C2/E2 on | C3/E3 and C4/E4 on | C5/E5 and C6/E6 on | .... | C2(N-1/E2(N-1) and C2N/E2N on |

MIMO COMMUNICATION SYSTEM

FIELD OF THE INVENTION

This invention relates to communication systems and has particular but non exclusive application to cellular communications systems as well as wireless mesh communication systems. It is applicable to transmitter/receiver elements which service other network devices such as user equipment, and whose transmitting/receiving function is divided into a number of radially distributed sectors. Further it has particular but not exclusive application to multiple input/multiple output (MIMO) systems divided into a number of sectors.

BACKGROUND OF THE INVENTION

A communication system is a facility which facilitates the communication between two or more entities such as communication devices, network entities and other nodes. A communication system may be provided by one or more interconnected networks. A communication device can be understood as a device provided with appropriate communication and control capabilities for enabling use thereof for communication with others parties. The communication may comprise, for example, communication of voice, electronic mail (email), text messages, data, multimedia and so on. A communication device typically enables a user of the device to receive and transmit communication via a communication system and can thus be used for accessing various service applications.

In cellular systems a network entity in the form of a base station provides a node for communication with mobile devices in one or more cells. A base station is often referred to as a 'Node B'. There are many different techniques for processing signals for transmission between the base station and the user equipment. Typically the operation of a base station apparatus and other apparatus of an access system required for the communication is controlled by a particular control entity. The control entity is typically interconnected with other control entities of the particular communication network.

Cellular communication systems typically employ a network of base stations (Node Bs) to communicate with User Equipment under the co-ordination of a network controller. The node Bs comprises one or more receiver/transmitter antenna means to perform said communication which may be downlink (i.e. from the base Station to the User equipment or uplink (from the User Equipment to the NodeB. Adjacent Node Bs also communicates with each other.

As far as the base stations are concerned these may comprise an array of multiple antennae which are arranged radially to cover transmission and reception in a plurality of sectors.

Multiple Input/Multiple Output (MIMO) systems are known systems which use multiple antennas at the transmitter and receiver (of e.g. base stations) along with advanced digital signal processing to improve link quality and capacity. More data can be received/sent where there are more antennae elements.

With MIMO systems however they usually need two to four times the number of transceivers compared to the Single Input/Single Output (SISO) systems. Generally also in MIMO systems the transceiver function is split into more sectors and so the number of components such as High Gain Power Amplifiers (HPAs) can be substantial in comparison. In particular HPAs contribute a large portion of the cost of such systems as well as the power consumption and thus eventually carbon emissions also.

It is an object of the invention to provide for a MIMO system which provides for an efficient system which however reduces the number of components required as well as reducing power consumption.

SUMMARY

In accordance with an embodiment there is provided a device comprising a plurality of transmitter and/or receiver units and/or antennae therefore, and wherein each of said units are arranged radially to cover a plurality of sectors; and including at least one component necessary for the operation of said units, and arranged such that said component is shared between two or more units and/or their respective antennae.

In a preferred embodiment the component is shared between units and/or their respective antennae in two neighbouring sectors and or used alternately by said units and/or antennae in said sectors.

Preferably the device includes means to determine requirements of usage in said sectors and utilise said component appropriately.

Preferably the component is switchably connected to said units and/or their antennae.

Switching means may comprise SPDTs or a switching matrix.

In one embodiment the component is used simultaneously by said units and/or the antennae therefor. This is preferably effected by a power divider.

Preferably each segment includes two antennae, each of said components is connected to one antenna in a plurality of segments.

The component may be a power amplifier. The device may be part of a MIMO system and or a network element/base station of a cellular or wireless mesh communication system The invention also comprises a method for operating a device, said device comprising a plurality of transmitter and/or receivers units and/or antennae therefor, and wherein each of said units are arranged radially to cover a plurality of sectors; and including at least one component necessary for the operation of said units, comprising sharing said component between two or more units and/or their respective antennae.

Preferably the sharing comprises sharing of said component between units and/or their respective antennae by two neighbouring sectors. The sharing may comprise using said component alternately by said units and/or their respective antennae.

Preferably the method includes determining requirements of usage in said sectors and sharing said component appropriately.

SUMMARY OF FIGURES

For a better understanding of the present invention and how the same may be carried into effect, reference will now be made by way of example only to the accompanying drawings in which.

Traditional wireless mesh node systems are based in an omni-antennae and one transceiver unit. However such kind of arrangement makes for poor mesh node performance when the mesh node number is increased. Another system is the advanced wireless mesh system which uses multi-radio, multi-channel and directional antenna architecture to increase throughput and reduce traffic delay. The mesh node may be configured with directional antenna, and multiple radios, which make the mesh node perform TX or RX in multiple sector simultaneously.

In the prior art example shown in 5, each mesh node is designed to support several simultaneous channels using multiple parallel RF front-end chips and baseband processing modules.

Figure 1:
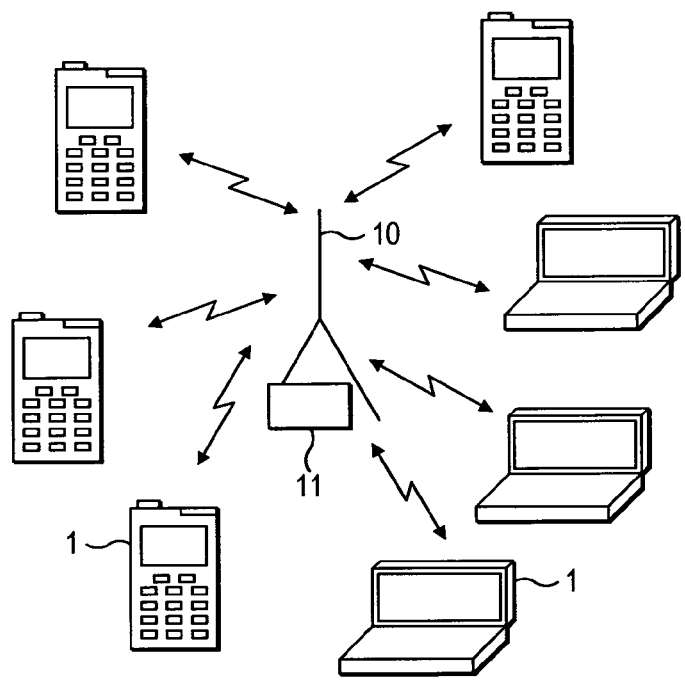
FIG. 1 shows a schematic presentation of a communication system wherein the invention may be embodied.

Before explaining in detail a few exemplifying embodiments, a brief explanation of wireless access is given with reference to FIG. 1 showing a communication system providing wireless communications to a plurality of communication devices 1. A communication device 1, for example a mobile user device or equipment, can be used for accessing various services and/or applications provided via the wireless communication system. A communication device can typically access wirelessly a communication system via at least one wireless transmitter and/or receiver node 10 of an access system. Non-limiting examples of access nodes are a base station of a cellular system, for example a 3G WCDMA Node B, an enhanced Node B (eNB) of 3GPP LTE (long term evolution), a base station of a wireless local area network (WLAN) and a satellite station of a satellite based communication system. The communication devices 1 may also communicate directly with each other.

The communications may be arranged in various manners based on an appropriate radio access technology or technologies. The access is provided via radio channels also known as access channels. Each communication device 1 may have one or more radio channels open at the same time. Each communication device may be connected to more than one base station 10 or similar entity. Also, a plurality of communicate devices may communicate with a base station or similar, and/or attempt to access the communication system via the same base station. A plurality of communication devices may also share a channel. For example, to start communications or to connect to a new access system, a plurality of communications devices may attempt to make the initial contact via a single channel, for example via a random access channel (RACH). The attempts to access may be made substantially at the same time.

The base station 10 of the access system can be connected to other parts of the communication system via appropriate connections, for one or more appropriate gateway nodes. These are not shown for clarity. A base station is typically controlled by at least one appropriate controller apparatus (this is true for GSM and WCDMA. However in LTE and WiMAX there is no controller anymore, but control functionality is distributed to appropriate network elements such as general access nodes, base stations, nodeB's, eNBs, AP's) generally denoted by 11 in FIG. 1. The controller apparatus 11 can be provided for managing of the operation of the base station and/or communications via the base station. The controller apparatus is typically provided with memory capacity and at least one data processor. Various functional entities may be provided in the controller by means of the data processing capability thereof. The functional entities provided in the base station controller may provide functions relating to radio resource control, access control, packet data context control, relay control and so forth.

Network elements, such as base stations 10 are managed by using network management operations support system (OSS). OSS's role is to supporting processes such as maintaining network inventory, provisioning services, configuring network components, and managing faults. OSS architecture is based on four layers: Business Management Level (BML), Service Management Level (SML), Network Management Level (NML), Element Management Level (EML). Network elements can be managed from network management system (NMS) or element management system (EMS). Base stations 10 are connected to NMS over open Itf-N (so called northbound interface) or to EMS over proprietary Itf-S interface (southbound interface).

A communication device 1 can be used for various tasks such as making and receiving phone calls, for receiving and sending data from and to a data network and for experiencing, for example, multimedia or other content. For example, a communication device may access applications provided via a telephone network and/or a data network, such as applications that are provided based on the Internet Protocol (IP) or any other appropriate protocol. An appropriate mobile communication device may be provided by any device capable of at least sending and/or receiving wireless signals from the access system. Non-limiting examples include a mobile station (MS) such as a mobile phone or a smart phone, a portable computer provided with a wireless interface card or other wireless interface facility, personal data assistant (PDA) provided with wireless communication capabilities, or any combinations of these or the like.

Figure 2:
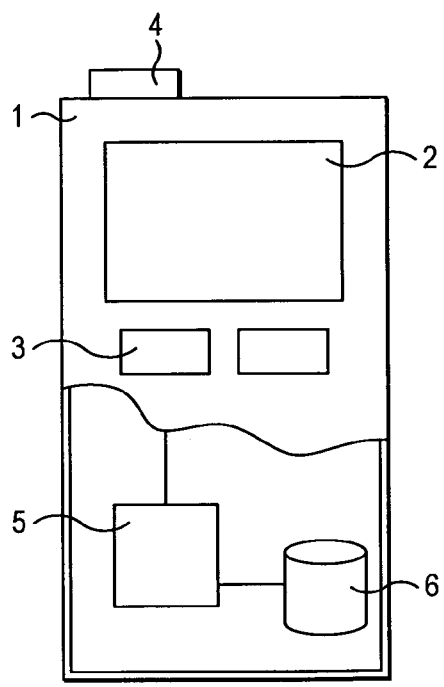
FIG. 2 shows a sectioned view of communication user equipment.

As shown in FIG. 2, a communication device 1 is typically provided with appropriate data processing apparatus, such as at least one data processor 5. At least one memory device 6 is also typically provided. The data processing and storage entities can be provided on an appropriate circuit board and/or in chipsets. Different functions and operations may be provided by different chips. Alternatively, at least partially integrated chips may be used. Antenna means 4, a display 2, and/or a keypad 3 may also be provided.

Figure 3:
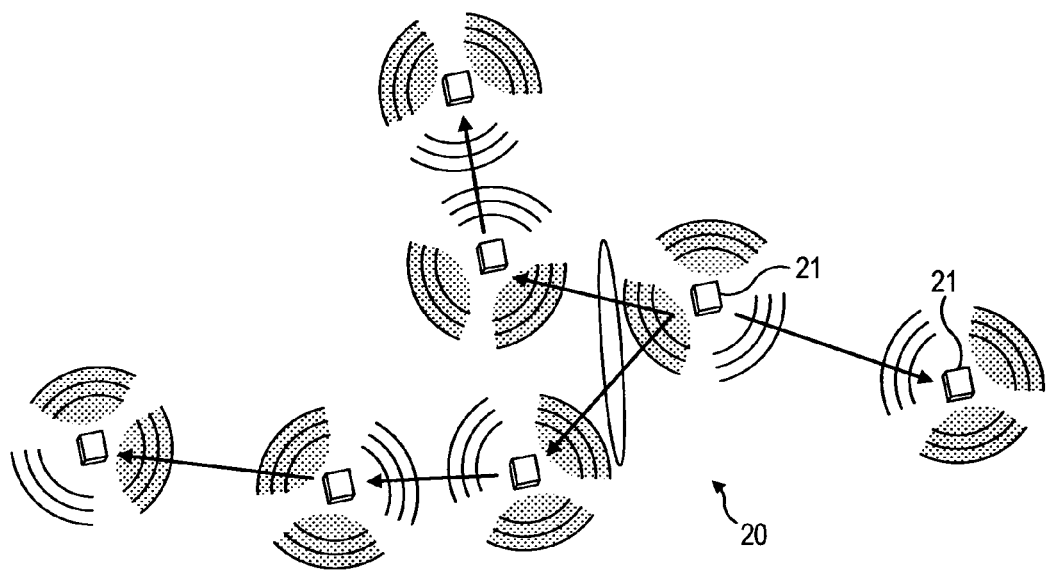
FIG. 3 shows a schematic representation of a transceiver device in a mesh wireless network which may embody the invention.

FIG. 3 shows schematically a portion of a prior art wireless mesh node communication system 20. Each mesh node 21 is equipped with antenna array, which consists of multiple antenna elements 22, such as three 120 degree antennas or six 60 degree antennas that deliver 360 degree coverage. Each sector antenna may focus energy in one direction, such as 120 degree/60 degree horizontal beam for greater signal strength and significantly longer range than omni-directional antennas. The directional capabilities of the antenna array also permit more effective utilization of available spectrum by allowing simultaneous communication between nodes in neighbouring areas as shown. The example of FIG. 3 shows the mesh node is configured with 3 sectors antenna array.

Figure 4:
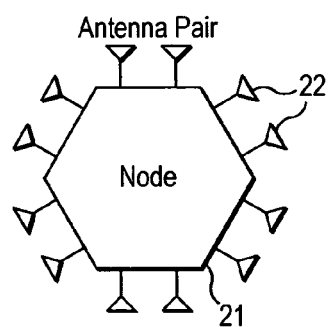
FIG. 4 shows more detail of such transceiver device.

FIG. 4 shows schematically an individual node configured with a six sector antenna array. Each antenna array comprises an antenna pair.

A brief description of prior art 2-multi sector base stations in a cellular system will now follow. Base stations with 3 sectors or more sectors are very common in cellular systems to increase the system capacity. In order to extend coverage area and increase the capacity, the RF transceivers should achieve high output power. RF front-end chips used in the transceivers don't usually offer high power, so high power amplifiers (HPA) are typically used. Along with the increase of the sectors in MIMO system, the number of HPA could be large. Compared with low power PA, high power PA usually cost much and these will increase the cost of final mesh node product.

Figure 5:
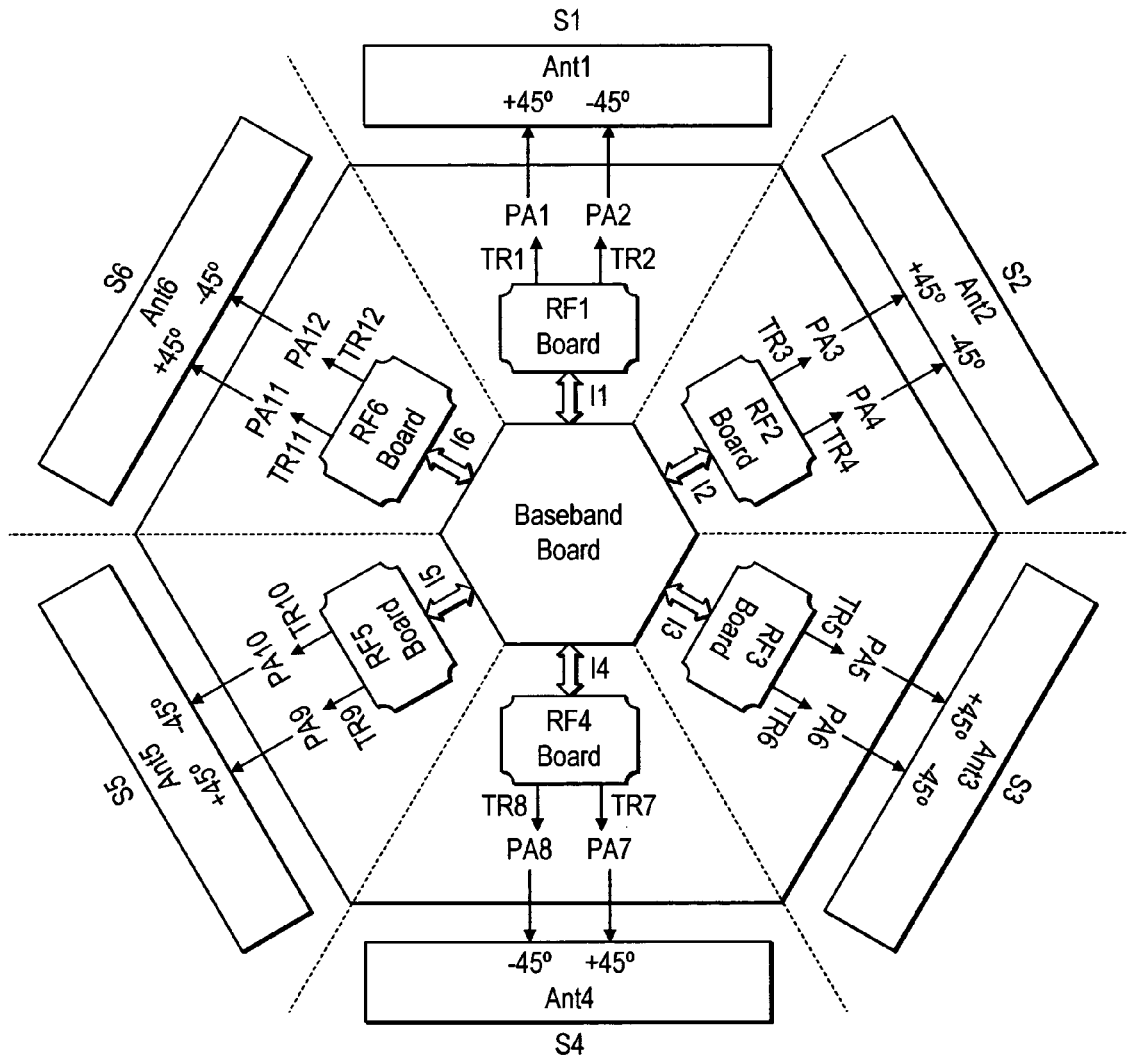
FIG. 5 shows a schematic representation of a transceiver device/base station divided into radially distributed sectors.
Figure 6:
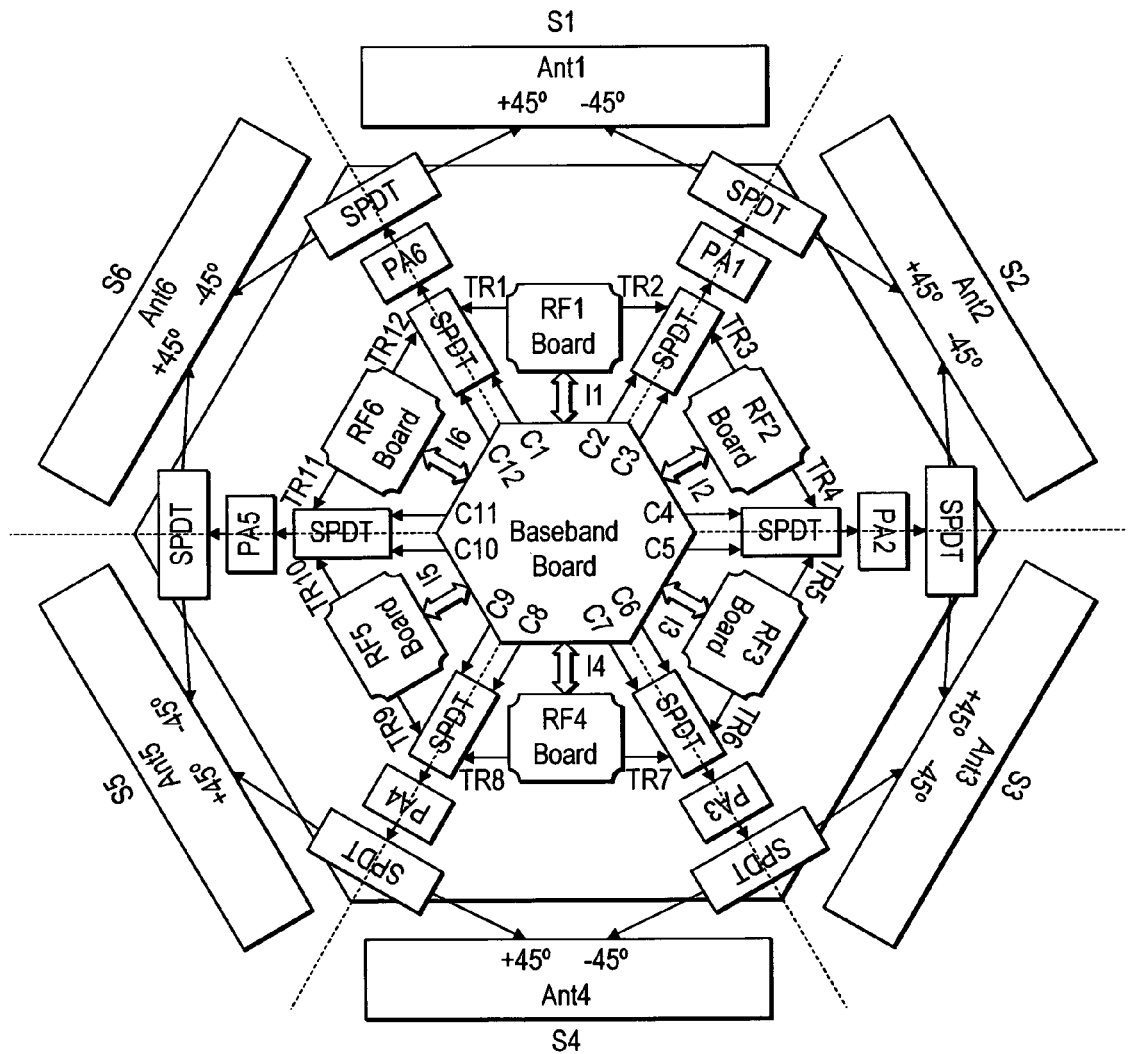
FIGS. 6, 7 and 8 show schematic representations of a transceiver device/base station arrangement according one embodiment of the invention illustrating a particular arrangement and operation.

In prior art base stations, radio connections are setup according to network topology, the radio link is designated "free" in the sector that has no radio connection (requirements). The existing HPA in the sector for the "free" radio link is wasted. In such multi sector MIMO systems, the number of HPA usually equals to the number of antenna elements. FIG. 5, shows in more detail a base station (NodeB) of a prior art MIMO cellular system. It is divided into six sectors each equipped with an antennae pair of different polarisation angle +45 and –45 degrees. For example, in a six sector 2×2 MIMO system, twelve HPA's are used as shown. Each sector includes one RF board, two HPA's and a ±45° cross-polarized antenna pair. Each RF board includes two TX/RX transceivers. The six sectors are designated S1 to S6, the six Rf boards (each with two transceiver units) are designated RF1 to RF6, and The twelve transceivers (these are not shown but are part of the RF board) and the signals therefrom are referenced TR1 to TR12. Ant1 to Ant6 are the reference numbers of six cross-polarized antenna pairs. I1 to I6 are the six interfaces between six RF boards and the baseband board.

For each antenna in all segments, one HPA is required; in the example this means there are twelve HPA. This introduces large cost and big power consumption.

DETAILED DESCRIPTION OF EXEMPLARY EMBODIMENTS

In order to save power, the inventors have determined that where the base station load is low, the HPA of some sectors can be switched off for power saving, and the active PA TX signal is sharing with the inactive PA sector. In this way, not only the PA is switched off, but also the baseband board (digital signal processor) of the sector is switched off. So the processing capacity of BTS is decreased and the capacity of base station is decreased.

For times where the base station loads are high, or more accurately where all sectors have to function at the same time HPA's need to be build in the base station to support all sectors work (high load case).

The invention in one simple embodiment may be arranged such that HPA between two neighbouring two sectors are shared, that the number of HPA either needed at that time or needed to be provided physically in the base station can be reduced by half. In this way, for example the number of HPA's needed for a six sector 2×2 MIMO system are reduced from twelve to six. Mesh node can be automatically configured to support up to three 2×2 MIMO radio connections in proper sector according to network deployment requirements.

In a cellular system for example according to an embodiment of the invention, a similar set-up idea can be used. In a preferred embodiment it may be determined at a certain time what the user equipment requirements may be (uplink and downlink transmissions) in particular sectors are. If a particular sector has no requirements, then the HPA of that sector can be utilized by its neighboring sectors. Or alternatively stated, a HPA may be provided and arranged such that it is common to two sectors.

Example 1

Figure 8:
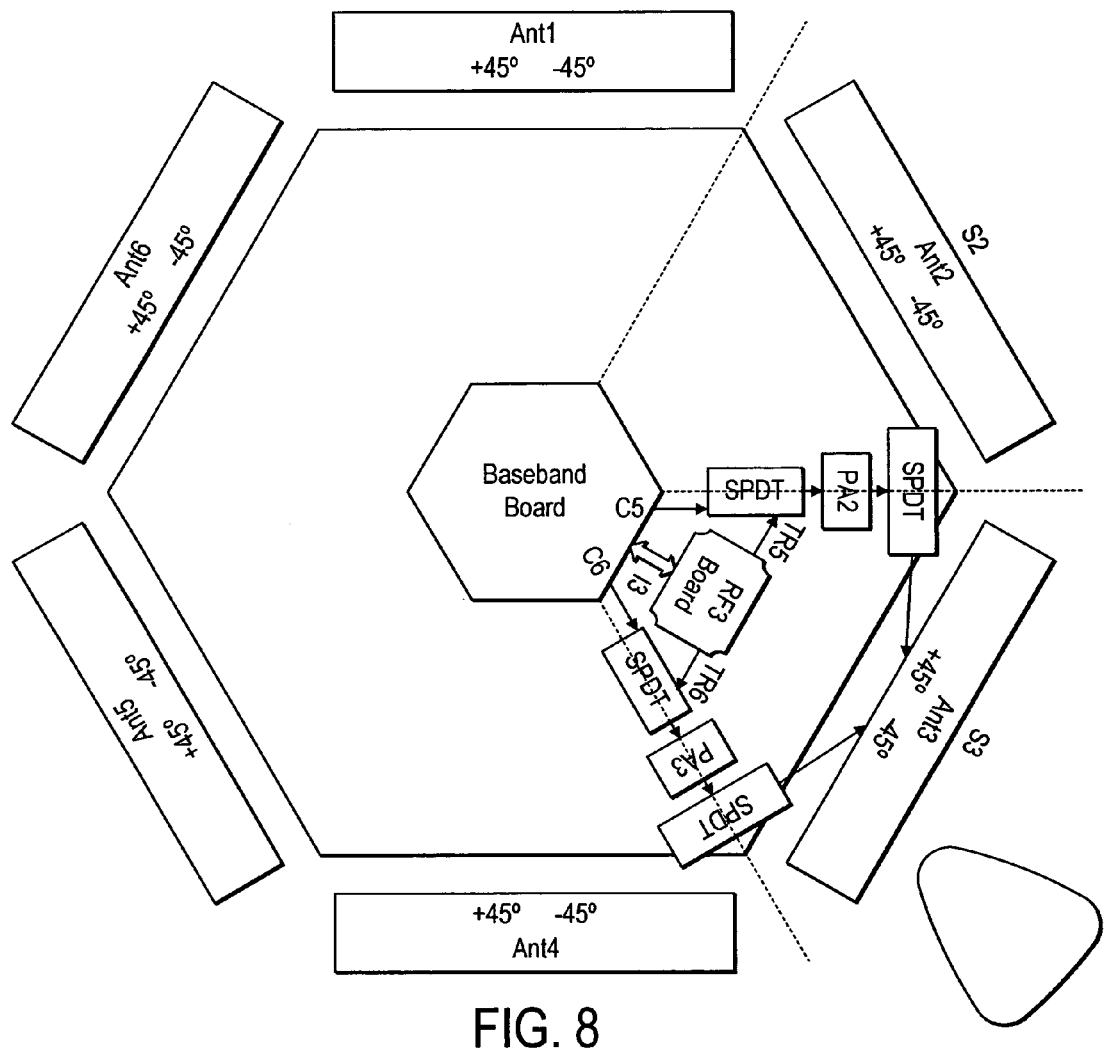

FIG. 8 illustrates in detail a particular embodiment of the invention. It shows a representation of a base station divided operably into six segments S1, S2, S3, S4, S5, S6. Each segment provides an antenna unit Ant 1 to Ant 6, each antenna unit having an antenna pair (+45°, –45°). Six power amplifiers (PA1 to PA6) are located between each segment. In this particular embodiment therefore, each PA is common (i.e. can be shared) in the operation of neighboring sectors.

Each sector includes two transceiver units (TR) located on the RF board that gives rise to transmission/reception signals (TR). The base band board part in this particular example comprises all the digital processing and protocol processing part of the mesh node or BTS. This part may be include several modules and processing units. Each board may process signal from one or multiple sectors. The baseband board may control the HPA switching between the sectors as well as provide digital baseband signal to the HPA. Sector S2 for example includes transmitter units TR3 and TR4. TR3 in sector S2 and transmitter unit TR2 in sector S1 use the same PA which is numbered as PA2. TR4 in sector S2 and TR5 in sector S3 use a common PA which is numbered PA3, i.e. TR4 in sector S2 and TR5 in sector S3 use the same PA which is numbered PA3.

Low cost Two Single Pole Double Throw (SPDT) switches (or 1×2 power divider) are used to effect the switching function. The similar idea can also be used in BTS design. This is shown with respect to FIG. 9 where two SPDT switches are added for each sector. C1 to C12 are the SPDT control signals.

When S2 is in use, control signals C3 and C4 are switched on and signals C2 and C5 are off. So TR3 is connected to PA2 and TR4 is connected to PA3 as shown. If we want to switch sector from S2 to S3, C5 and C6 are on, C4 and C7 off as shown in figures.

The base station may schedule uplink and downlink communication for the sectors. In an embodiment according to one aspect of the invention, scheduling of sectors may be performed for different sectors at different times. PA1 and PA2 can be used to support sector S2 downlink MIMO when there are no uplink and downlink requirements for sectors 1 and 3.

Figure 7:
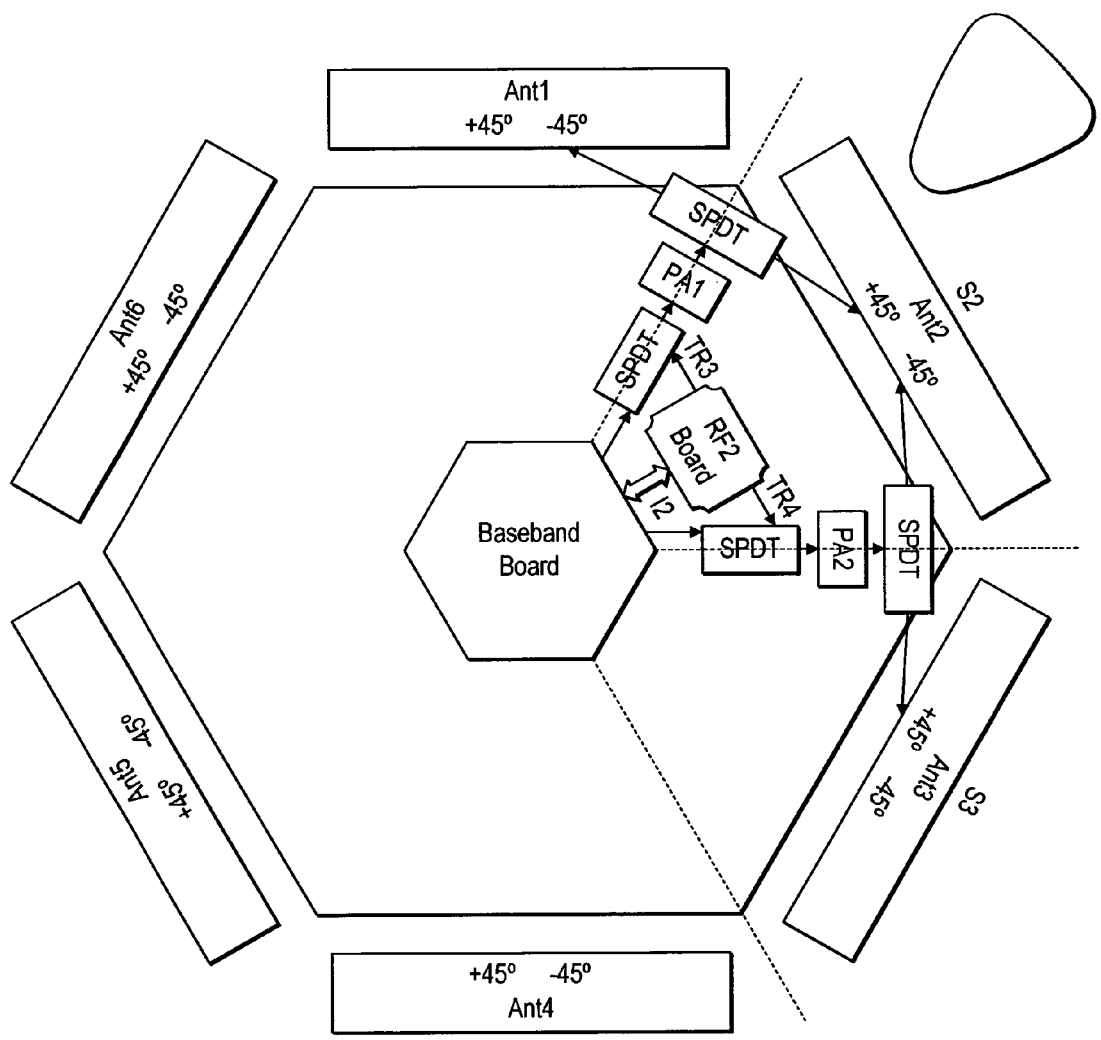

PA1 and PA2 also can be used to support sector S2 downlink MIMO when there are uplink requirements for sectors 1 and 3. Sector 1 and 3 are the same. If it is determined that in S2 all users are transmitting in DL and at the same time in S3 all users are transmitting in UL, power amplifiers PA1 and PA2 can be used to support 2×2 MIMO in S2 as shown in FIG. 7. Later S2 can be scheduled to transmit in UL and S3 in DL when P2 and P3 can be used to support 2×2 MIMO in S3 as shown in FIG. 8.

Other scheduling possibilities would be clear to the skilled person in certain applications. For example HPA may be shared between Uplink and Downlink case, e.g. for TDD in a SON network. A simple example is that in time slot 1, User A may send a packet in UL in sector 1 using frequency 1, and User B may receive packet from BTS in sector 2 using frequency 2. In time slot 2, User A and User B alter the procedure. The transmitter can be switched between sector 1 and sector 2.

In another scheduling scheme, one sector e.g. S2 may transmit in downlink using PA1 and PA2 whilst sectors S1 and S3 transmit in uplink at the same time.

The embodiment may be applicable in particular but not exclusively to mesh applications. Unlike base stations in cellular network, wireless mesh network elements output power is very low (less than 1 W). CPE's (Customer Premises Equipments) RF always output low power and may be used in mesh node to reduce the cost.

Example 2

As an alternative to SPDT switching, the switching of common HPAs between neighboring sectors may be implemented by an RF switcher matrix. This may be located between the transmitter/receiver units and the antennae.

However in certain applications where there is a relatively low power requirement, switching using SPDTs or the like is preferable due to their lower cost. RF switch matrix cost may be too high for mesh node applications.

In both the examples above, HPA's which are common to neighbouring sectors may be shared such that at different times they may be used by the neighbouring two sectors to support 2×2 MIMO (prefer to say multiple input/multiple output via two antennae.

Example 3

In the above described arrangements, neighbouring sectors cannot support radio connection work at 2×2 MIMO mode at the same time i.e. simultaneously which may limit the mesh node function some times.

In a preferred embodiment of the invention therefore, the arrangement may be set up such that the functionality of the power amplifiers may be shared at the same time i.e. simultaneously. According to a preferred embodiment this may be provided by the use of a power divider. In this way MIMO signals may be provided to two neighbouring sector at the same time.

Figure 9:
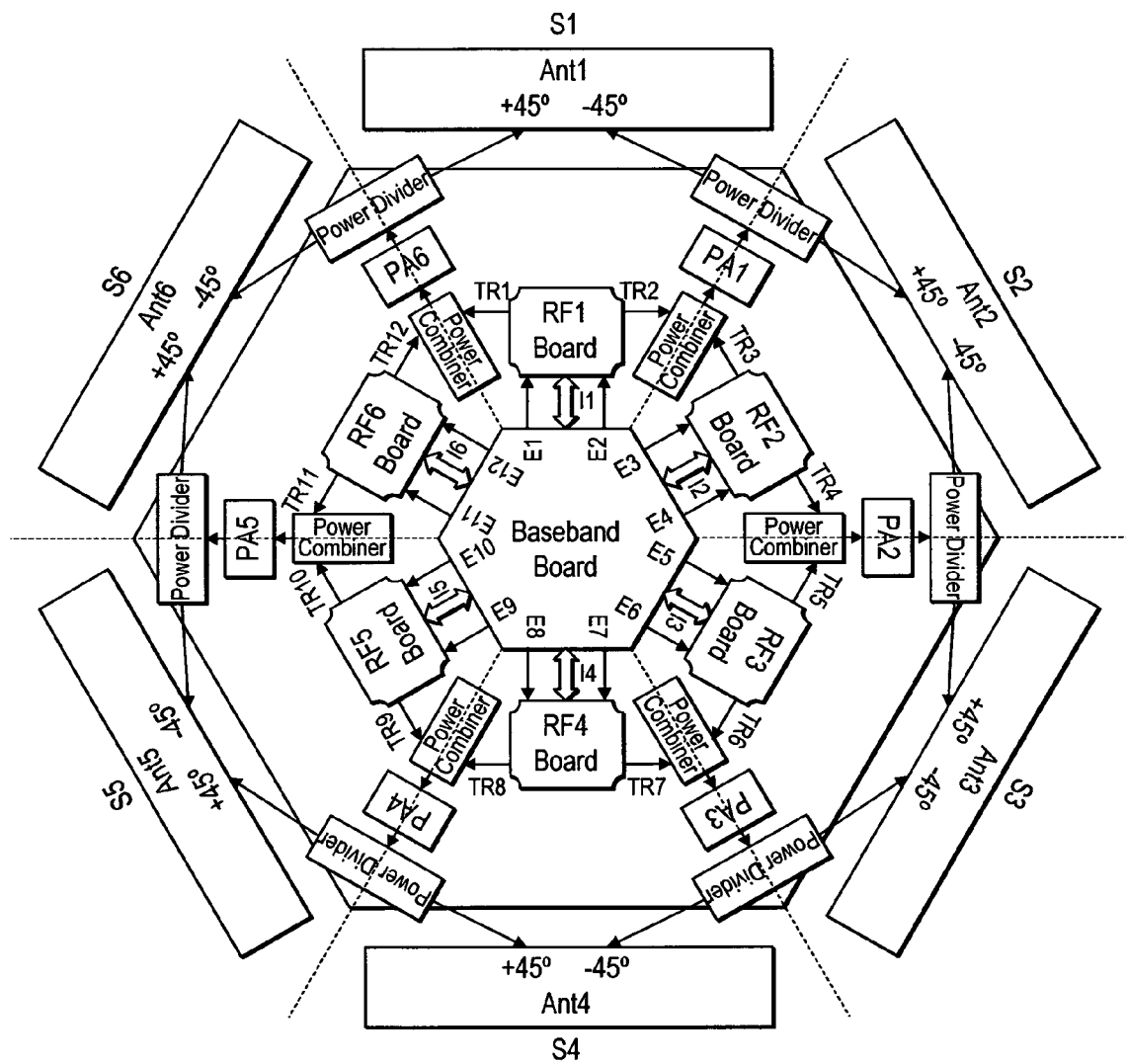
FIGS. 9 and 10 show schematic representations of a transceiver device/base station arrangement according to another embodiment of the invention illustrating a particular arrangement and operation.
Figure 10:
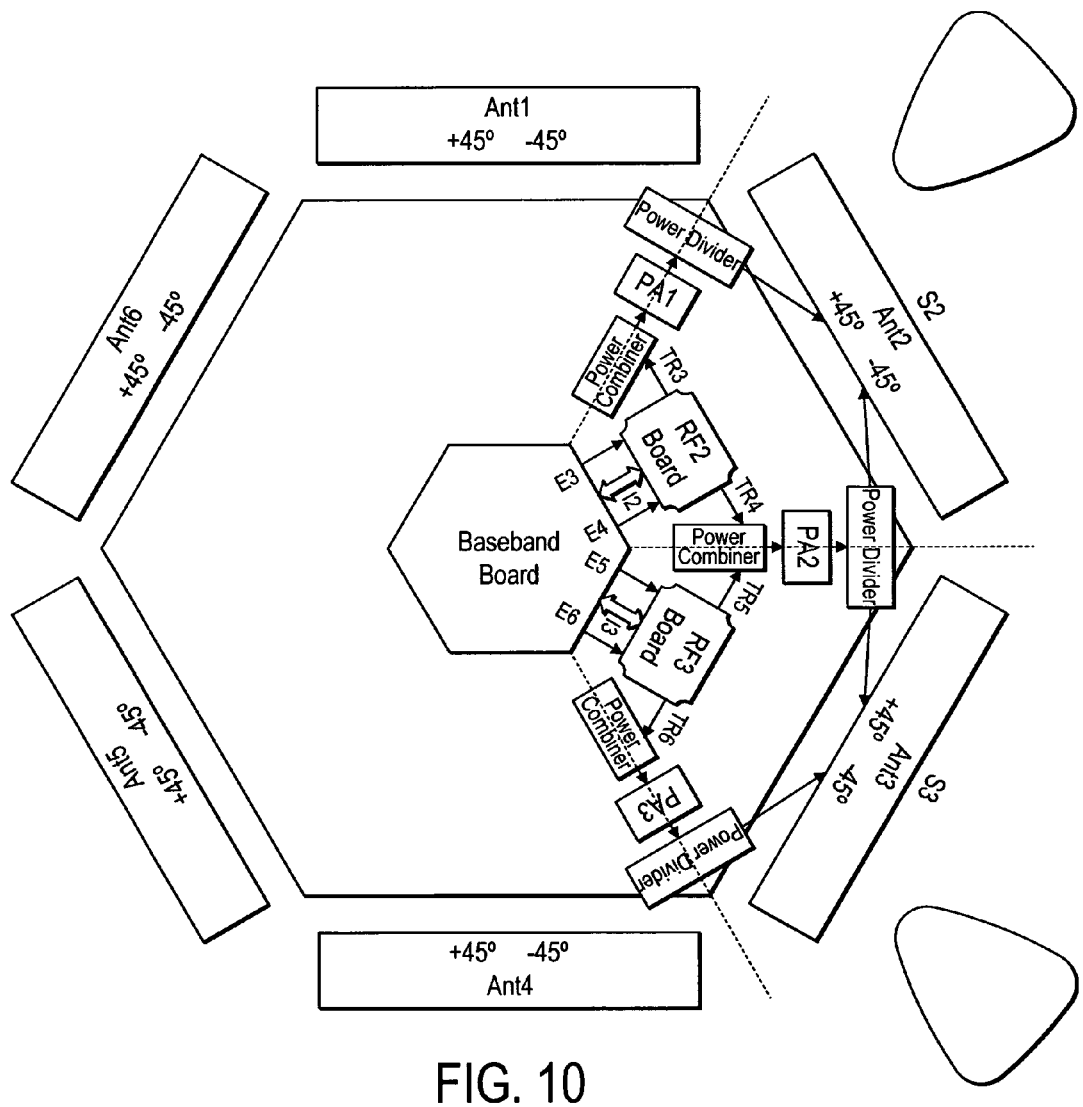

FIG. 9 shows a similar arrangement to previous figures with similar annotated components. However the SPDTs are replaced with power dividers and power combiners. There is a power combiner provided between each sector and connected between a common power amplifier PA (shared between two neighbouring sectors) and the output of two transceiver units each from different but neighbouring sectors. In addition the arrangement is set up such that there is a power divider located between the shared PA and two antennae each located in a different but neighbouring sector.

In operation, the mode of sector switching may be as follows. E1 to E12 are enable signals for the twelve transceivers. When only sector S2 is operating, enable signals E3 and E4 are switched on. When only sector S3 is operating (e.g. when switched from sector S2 to S3), enable signals E5 and E6 are on, and E4 and E7 are off. When both sector S2 and sector S3 are operating simultaneously all signals E5, E6, E4 and E7 are on. The interface between RF2 board and baseband I2 are the same with the interface between RF3 board and baseband I3.

As mentioned, scheduling of the sectors may include determining the usage in particular sectors. If a particular sector has no requirement, then the functionality of any shared PAs may be utilised by neighbouring sectors. Various other scheduling schemes may be utilised. For example if there is only a downlink or (an uplink requirement) in a particular sector then one PA common to that sector and one of its neighbours may be used for that requirement and the PA common to that sector an its other neighbour may be used by that neighbour. Various other combinations and permutations of scheduling would be clear to the skilled person.

Figures 11, 12:
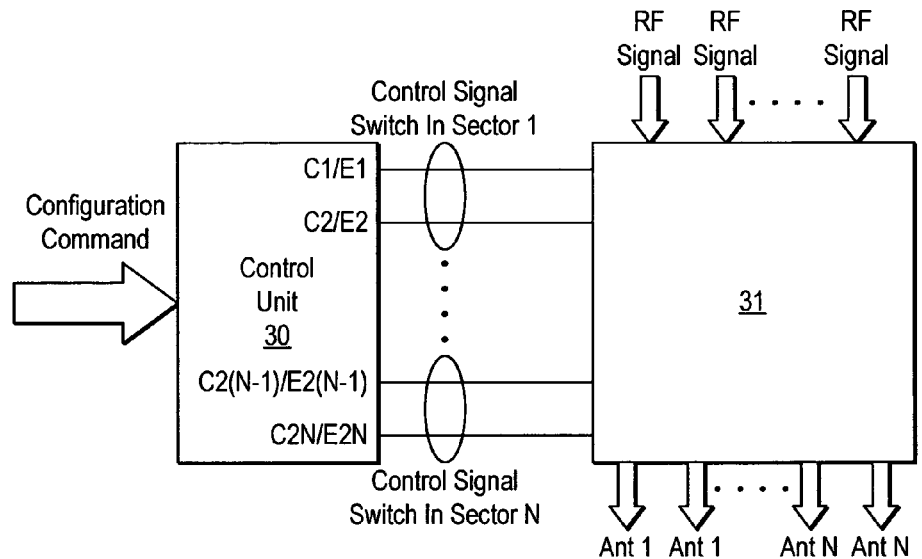
FIG. 11 shows a block diagram of a control arrangement which may be utilised in embodiments of the invention.
FIG. 12 shows a table illustrating an example of the logical set up which may be used in the above examples.

FIG. 11 shows an example of a controlling arrangement which may be used according to an embodiment for controlling the switching in the above arrangements. To realise automatically control for the RF signal connection between HPA and antenna port, a control unit 30 is provided set the digital control for the proper configuration of transmissions/receptions for example voltage levels. Output from this is control signals for the switches in each sector.

These are then input into an RF switch array 31 along with RF signals from each Power Amplifiers. The output of the switch array provides signals for each antenna.

FIG. 12 shows an example of a logic table which may be used in the configuration of such embodiment.

The advantages of this invention are e.g. that HPAs in "free" sector are used instead for other sectors, and which reduces the number of HPA used in multi sector MIMO system. Consequently there is a reduction in the product cost and power consumption. The invention also allows for flexible HPA combination arrangements. The idea can be used e.g. in wireless mesh system and the cellular system. Since the invention involves a particular feature of multi sector MIMO system: low power consumption and low cost. In any other system, usage can be easily proven by the power consumption and price information. Or we can check the number of HPA directly.

The above described functions can be provided by means of appropriate software and data processing apparatus. Functions may be incorporated into any appropriate network element or management system and may be provided by means of one or more data processors. The data processor may be provided by means of, for example, at least one chip. Appropriate data processing may be provided in a processing unit provided in association with a communication device, for example a mobile station. The data processing may be distributed across several data processing modules. The above described functions may be provided by separate processors or by an integrated processor. An appropriately adapted computer program code product or products may be used for implementing the embodiments, when loaded on an appropriate data processing apparatus. The program code product for providing the operation may be stored on and provided by means of an appropriate carrier medium. An appropriate computer program can be embodied on a computer readable record medium. A possibility is to download the program code product to a communication device via a data network.

It is also noted that although certain embodiments were described above by way of example with reference to certain exemplifying architectures for wireless networks, technologies and standards, embodiments may be applied to any other suitable forms of communication systems than those illustrated and described herein.

It is also noted herein that while the above describes exemplifying embodiments of the invention, there are several variations and modifications which may be made to the disclosed solution without departing from the scope of the present invention.

The invention claimed is:
1. An apparatus comprising:
   at least one processor;
   memory storing computer program code;
   wherein the memory storing the computer program code is configured to, with the at least one processor, cause the apparatus to at least:
   control connection of at least one power amplifier shared between at least two of a plurality of communication assemblies each comprising at least one receiver, trans- mitter, or antenna therefor, and wherein the communication assemblies are arranged radially to cover a plurality of sectors; and wherein controlling connection of the at least one power amplifier is performed based at least in part on load conditions experienced by sectors served by the communication assemblies, wherein the at least one power amplifier and its corresponding baseband board are switched off when traffic load of the sectors is low and the at least one power amplifier is inactive.

2. The apparatus as claimed in claim 1 wherein said at least one power amplifier is shared between communication assemblies covering at least two neighbouring sectors.

3. The apparatus as claimed in claim 1 wherein said at least one power amplifier is used alternately by said units and/or antennae in said sectors.

4. The apparatus as claimed in claim 1 wherein the memory storing the computer program code is further configured to, with the at least one processor, cause the apparatus to determine power requirements of the sectors based on the loads of the sectors.

5. The apparatus as claimed in claim 1 wherein said at least one power amplifier is switchably connected to said communication assemblies using an SPDT or a switching matrix.

6. The apparatus as claimed in claim 1 where said at least one power amplifier is used simultaneously by said units and/or the antennae therefor.

7. The apparatus as claimed in claim 6 wherein said at least one power amplifier is coupled with a power divider.

8. The apparatus as claimed in claim 1 wherein each communication assembly includes two antennae, and wherein each of said at least one power amplifier is connected to one antenna of each of a plurality of communication assemblies.

9. The apparatus as claimed in claim 1, wherein the apparatus forms a part of a network element of a multi-input-multi-output cellular communication system or a wireless mesh communication system.

10. A method comprising:
controlling connection of at least one power amplifier shared between at least two of a plurality of communication assemblies each comprising at least one receiver, transmitter, or antenna therefor, and wherein the communication assemblies are arranged radially to cover a plurality of sectors; and wherein controlling connection of the at least one power amplifier is performed based at least in part on load conditions experienced by sectors served by the communication assemblies, wherein the at least one power amplifier and its corresponding baseband board are switched off when traffic load of the sectors is low and the at least one power amplifier is inactive.

11. The method as claimed in claim 10 wherein said at least one power amplifier is shared between communication assemblies covering at least two neighbouring sectors by two neighbouring sectors.

12. The method as claimed in claim 10 wherein said connection is controlled so as to allow use of said power amplifier alternately by said communication assemblies.

13. The method as claimed in claim 10 further comprising determining determine power requirements of the sectors based on the loads of the sectors.

14. The method as claimed in claim 10 wherein a communication assembly transmits in downlink or receives in uplink whilst a communication assembly sharing the said power amplifier is idle.

15. The method as claimed in claim 10 wherein a communication assembly transmits in downlink (or receives in uplink) whilst one or more of the communication assemblies which share one of said at least one power amplifier receives in uplink (or transmits in downlink respectively).

16. The method as claimed in claim 10, wherein controlling connection of said at least one power amplifier comprises switchably connecting at least one power amplifier to said communication assemblies, where switching is effected by an SPDT or switching matrix.

17. The method as claimed in claim 10 wherein controlling connection of said at least one power amplifier comprises connecting at least one power amplifier to said communication assemblies in conjunction with a power divider.

18. The method as claimed in claim 10, wherein the plurality of communication assemblies comprise a part of a network element/base station of a MIMO cellular communication system or a wireless mesh communication system.

19. The apparatus of claim 1, wherein controlling connection of the at least one power amplifier comprises disconnecting the power amplifier from a communication assembly serving a sector experiencing a low load.

20. The method of claim 10, wherein controlling connection of the at least one power amplifier comprises disconnecting the power amplifier from a communication assembly serving a sector experiencing a low load.

* * * * *